United States Patent
Choi

(10) Patent No.: US 7,878,938 B2
(45) Date of Patent: Feb. 1, 2011

(54) POWER TRAIN OF AUTOMATIC TRANSMISSION

(75) Inventor: Hyun Seok Choi, Yongin (KR)

(73) Assignee: Hyundai Motor Company, Seoul (KR)

( * ) Notice: Subject to any disclaimer, the term of this patent is extended or adjusted under 35 U.S.C. 154(b) by 547 days.

(21) Appl. No.: 11/951,542

(22) Filed: Dec. 6, 2007

(65) Prior Publication Data

US 2009/0118064 A1   May 7, 2009

(30) Foreign Application Priority Data

Nov. 2, 2007   (KR) ...................... 10-2007-0111537

(51) Int. Cl.
    *F16H 3/62* (2006.01)
(52) U.S. Cl. ...................... 475/275; 475/276
(58) Field of Classification Search ......... 476/275–278, 476/284
    See application file for complete search history.

(56) References Cited

U.S. PATENT DOCUMENTS

| | | | |
|---|---|---|---|
| 6,827,664 B2* | 12/2004 | Stevenson et al. ........... | 475/275 |
| 7,029,417 B2* | 4/2006 | Borgerson et al. .......... | 475/284 |
| 7,108,628 B2* | 9/2006 | Ziemer et al. ............... | 475/278 |
| 7,276,011 B2* | 10/2007 | Tabata et al. ................ | 475/276 |
| 2003/0083174 A1* | 5/2003 | Tabata et al. ................ | 475/323 |
| 2006/0142112 A1* | 6/2006 | Kamada et al. ............. | 475/275 |
| 2007/0287572 A1* | 12/2007 | Tabata et al. ................ | 475/254 |
| 2008/0312027 A1* | 12/2008 | Choi .......................... | 475/296 |
| 2009/0048057 A1* | 2/2009 | Choi .......................... | 475/272 |
| 2009/0203479 A1* | 8/2009 | Krause et al. ................. | 475/59 |

FOREIGN PATENT DOCUMENTS

JP    2001-082555 A    3/2001

* cited by examiner

*Primary Examiner*—Ha D. Ho
(74) *Attorney, Agent, or Firm*—Morgan, Lewis & Bockius LLP

(57) ABSTRACT

A power train of an automatic transmission realizes nine forward speeds and two reverse speeds. An output unit selectively receives reduced rotation speed from a speed reduction unit or selectively receives rotation speed of an input shaft and generates the nine forward speeds and two reverse speeds by operation of five clutches and three brakes.

10 Claims, 9 Drawing Sheets

FIG. 2

|  | C1 | C2 | C3 | C4 | C5 | B1 | B2 | B3 |
|---|---|---|---|---|---|---|---|---|
| D1 | ○ |  |  |  |  |  |  | ○ |
| D2 | ○ |  |  |  |  |  | ○ |  |
| D3 | ○ |  |  |  |  | ○ |  |  |
| D4 | ○ | ○ |  |  |  |  |  |  |
| D5 |  | ○ | ○ |  |  |  |  |  |
| D6 |  |  | ○ |  | ○ |  |  |  |
| D7 |  |  | ○ | ○ |  |  |  |  |
| D8 |  |  |  | ○ | ○ |  |  |  |
| D9 |  |  |  | ○ |  | ○ |  |  |
| REV1 |  |  |  |  | ○ |  |  | ○ |
| REV2 |  |  |  |  | ○ |  | ○ |  |

FIG. 5

|     | C1 | C2 | C3 | C4 | C5 | B1 | B2 | B3 |
|-----|----|----|----|----|----|----|----|----|
| D1  | ○  |    |    |    |    |    |    | ○  |
| D2  | ○  |    |    |    |    |    | ○  |    |
| D3  | ○  |    |    |    |    | ○  |    |    |
| D4  | ○  | ○  |    |    |    |    |    |    |
| D5  |    | ○  | ○  |    |    |    |    |    |
| D6  |    |    | ○  |    | ○  |    |    |    |
| D7  |    |    | ○  | ○  |    |    |    |    |
| D8  |    |    |    | ○  | ○  |    |    |    |
| D9  |    |    |    | ○  |    | ○  |    |    |
| REV1|    |    |    |    | ○  |    |    | ○  |
| REV2|    |    |    |    | ○  |    | ○  |    |

FIG. 8

|     | C1 | C2 | C3 | C4 | C5 | B1 | B2 | B3 |
|-----|----|----|----|----|----|----|----|----|
| D1  | ○  |    |    |    |    |    |    | ○  |
| D2  | ○  |    |    |    |    |    | ○  |    |
| D3  | ○  |    |    |    |    | ○  |    |    |
| D4  | ○  | ○  |    |    |    |    |    |    |
| D5  |    | ○  | ○  |    |    |    |    |    |
| D6  |    |    | ○  |    | ○  |    |    |    |
| D7  |    |    | ○  | ○  |    |    |    |    |
| D8  |    |    |    | ○  | ○  |    |    |    |
| D9  |    |    |    | ○  |    | ○  |    |    |
| REV1|    |    |    |    | ○  |    |    | ○  |
| REV2|    |    |    |    | ○  |    | ○  |    |

US 7,878,938 B2

POWER TRAIN OF AUTOMATIC TRANSMISSION

CROSS-REFERENCE TO RELATED APPLICATION

This application claims priority to and the benefit of Korean Patent Application No. 10-2007-0111537, filed in the Korean Intellectual Property Office on Nov. 2, 2007, the entire contents of which are incorporated herein by reference.

BACKGROUND OF THE INVENTION (a) Field of the Invention

The present invention relates to a power train of an automatic transmission. More particularly, the present invention relates to a power train of an automatic transmission that realizes nine forward speeds and two reverse speeds.

(b) Description of the Related Art

A typical shift mechanism of an automatic transmission utilizes a combination of a plurality of planetary gear sets. A power train of such an automatic transmission changes rotational speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a power train, such as durability, efficiency in power transmission, and size, depend a lot on the layout of the combined planetary gear sets. Therefore, designs for a combining structure of a power train are also under continuous investigation.

A manual transmission that has too many shift-speeds causes inconvenience to a driver. Therefore, the advantageous features of having more shift-speeds are more important in an automatic transmission because an automatic transmission automatically controls the shifting operations.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power train of an automatic transmission having advantages of improving power delivery performance and reducing fuel consumption as a consequence of realizing nine forward speeds and two reverse speeds by using three or four planetary gear sets, five clutches, and three brakes.

A power train of an automatic transmission according to exemplary embodiments of the present invention may include: a speed reduction unit including a first operating member fixedly connected to a transmission case, a second operating member always receiving rotation speed of an input shaft and a third operating member generating reduced rotation speed by operation of the first and second operating members; an output unit including a fourth operating member selectively receiving the reduced rotation speed from the third operating member or selectively connected to the transmission case, a fifth operating member selectively receiving the rotation speed of the input shaft, selectively receiving the reduced rotation speed from the third operating member, or selectively connected to the transmission case, a sixth operating member selectively connected to the transmission case, a seventh operating member selectively receiving the reduced rotation speed from the third operating member or selectively receiving the rotation speed of the input shaft, and an eighth operating member generating nine forward speeds and two reverse speeds by operation of the fourth, fifth, sixth, and seventh operating members; and a plurality of friction members selectively connecting operating members of the speed reduction unit and the output unit to the input shaft, other operating members, or the transmission case.

The plurality of friction members may include: a first clutch selectively connecting the third operating member to the seventh operating member; a second clutch selectively connecting the third operating member to the fifth operating member; a third clutch selectively connecting the seventh operating member to the input shaft; a fourth clutch selectively connecting the fifth operating member to the input shaft; a fifth clutch selectively connecting the third operating member to the fourth operating member; a first brake selectively connecting the fourth operating member to the transmission case; a second brake selectively connecting the fifth operating member to the transmission case; and a third brake selectively connecting the sixth operating member to the transmission case.

The speed reduction unit may be a first planetary gear set having a first sun gear, a first ring gear, and a first planet carrier as operating members thereof.

The first planetary gear set may be a single pinion planetary gear set, wherein the first sun gear is operated as the first operating member, the first ring gear is operated as the second operating member, and the first planet carrier is operated as the third operating member.

The output unit of a power train according to the first and second exemplary embodiments of the present invention may be a second planetary gear set having a second sun gear, a third sun gear, a second planet carrier, a second ring gear, and a third ring gear as operating members thereof, wherein the second planetary gear set is a compound planetary gear set where a single pinion planetary gear set provided with the second sun gear, the second planet carrier, and the second ring gear and a double pinion planetary gear set provided with the third sun gear, the second planet carrier, and the third ring gear have the second planet carrier in common.

The second sun gear may be operated as the fourth operating member, the second planet carrier may be operated as the fifth operating member, the second ring gear may be operated as the sixth operating member, the third sun gear may be operated as the seventh operating member, and the third ring gear may be operated as the eighth operating member.

According to the first exemplary embodiment of the present invention, the second planet carrier is connected to a second pinion gear and a third pinion gear, wherein one end of the second pinion gear is respectively engaged with the second ring gear and the second sun gear, the other end of the second pinion gear is engaged with the third ring gear and the third pinion gear, and the third pinion gear is engaged with the third sun gear.

According to the second exemplary embodiment of the present invention, the second planet carrier is connected to a second pinion gear and a third pinion gear, wherein one end of the second pinion gear is engaged with the second ring gear, a middle portion of the second pinion gear is engaged with the second sun gear, the other end of the second pinion gear is respectively engaged with the third ring gear and the third pinion gear, and the third pinion gear is engaged with the third sun gear.

The output unit of a power train according to the third exemplary embodiment of the present invention may be a second planetary gear set having a second sun gear, a second planet carrier, a second ring gear, a third sun gear, a fourth sun gear, and a third ring gear as operating members thereof, wherein the second planetary gear set is a compound planetary gear set where a single pinion planetary gear set provided with the second sun gear, the second planet carrier, and the second ring gear and a Ravingneaux planetary gear set provided with the third sun gear, the fourth sun gear, the second planet carrier, and the third ring gear have the second planet carrier in common.

The second sun gear may be fixedly connected to the third sun gear, wherein the fixedly connected second sun gear and third sun gear are operated as the fourth operating member, the second planet carrier is operated as the fifth operating member, the second ring gear is operated as the sixth operating member, the fourth sun gear is operated as the seventh operating member, and the third ring gear is operated as the eighth operating member.

The second planet carrier may be connected to a second pinion gear, a third pinion gear, and a fourth pinion gear, and the second pinion gear is coaxially connected to the third pinion gear, wherein the second pinion gear is respectively engaged with the second ring gear and the second sun gear, one end of the third pinion gear is engaged with the third sun gear, the other end of the third pinion gear is respectively engaged with the third ring gear and the fourth pinion gear, and the fourth pinion gear is engaged with the fourth sun gear.

The above features and advantages of the present invention will be apparent from or are set forth in more detail in the accompanying drawings, which are incorporated in and form a part of this specification, and the following Detailed Description of the invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2 is an operational chart for a power train of an automatic transmission according to the first exemplary embodiment of the present invention.

FIG. 5 is an operational chart for a power train of an automatic transmission according to the second exemplary embodiment of the present invention.

FIG. 8 is an operational chart for a power train of an automatic transmission according to the third exemplary embodiment of the present invention.

Figure 1:
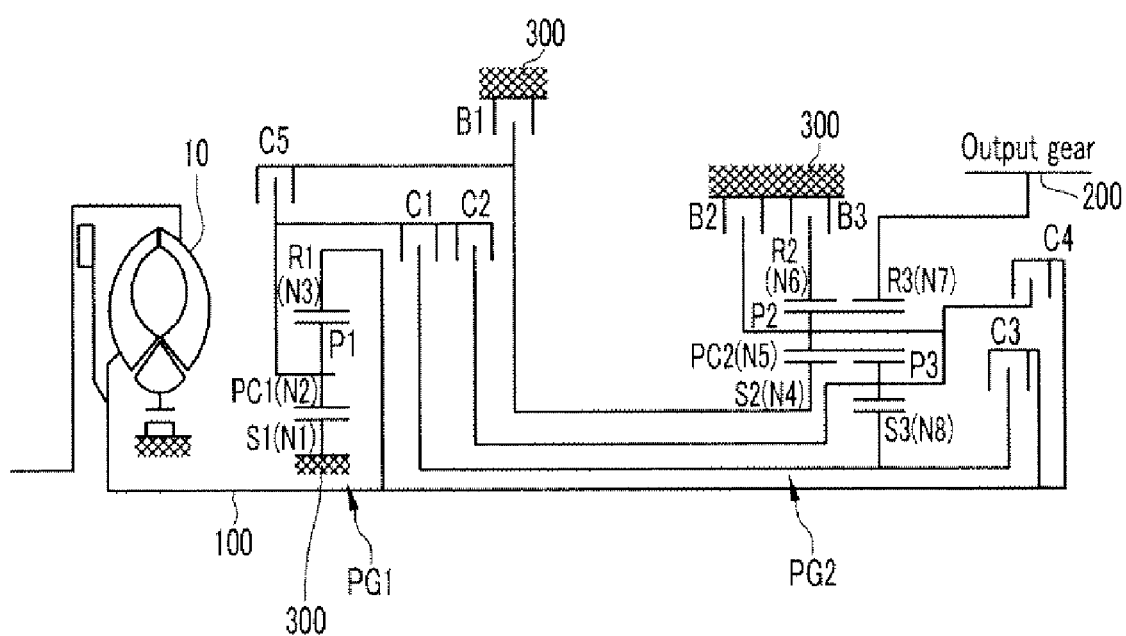
FIG. 1 is a schematic diagram of a power train of an automatic transmission according to the first exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Thereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

As shown in FIG. 1 to FIG. 9, power trains of an automatic transmission according to exemplary embodiments of the present invention include an input shaft 100, an output gear 200, a transmission case 300, a speed reduction unit PG1, an output unit PG2, and a plurality of friction members C1, C2, C3, C4, C5, B1, B2, and B3.

The input shaft 100 receives torque from an engine (not shown) through a torque converter 10.

The output gear 200 transmits torque from the power train.

The speed reduction unit PG1 includes first, second, and third operating members. The speed reduction unit PG1 receives torque from the input shaft 100 and transmits reduced rotation speed to the output unit PG2 by operation of the first, second, and third operating members. The first operating member is fixedly connected to the transmission case 300 and is always stopped. The second operating member is fixedly connected to the input shaft 100 and always rotates with the same rotation speed as the input shaft 100. The third operating member generates the reduced rotation speed by operation of the first and second operating members.

The output unit PG2 includes fourth, fifth, sixth, seventh, and eighth operating members. The output unit PG2 receives the reduced rotation speed from the speed reduction unit PG1 or receives the torque from the input shaft 100, and transmits nine forward speeds and two reverse speeds to the output gear 200. The fourth operating member selectively receives the reduced rotation speed from the third operating member or is selectively connected to the transmission case 300 to be selectively stopped. The fifth operating member is selectively connected to the input shaft 100 and selectively receives the rotation speed of the input shaft 100, selectively receives the reduced rotation speed from the third operating member, or is selectively connected to the transmission case 300 to be selectively stopped. The sixth operating member is selectively connected to the transmission case 300 to be stopped. The seventh operating member selectively receives the reduced rotation speed from the third operating member or selectively receives the rotation speed of the input shaft 100. The eighth operating member is fixedly connected to the output gear 200 and outputs the nine forward speeds and two reverse speeds generated by operation of the fourth, fifth, sixth, and seventh operating members to the output gear 200.

The plurality of friction members connect operating members of the speed reduction unit PG1 and the output unit PG2 to the input shaft 100, other operating members, or the transmission case 300. The plurality of friction members include first, second, third, fourth, and fifth clutches C1, C2, C3, C4, and C5 and first, second, and third brakes B1, B2, and B3. The first clutch C1 selectively connects the third operating member to the seventh operating member to selectively transmit the reduced rotation speed of the third operating member to the seventh operating member. The second clutch C2 selectively connects the third operating member to the fifth operating member to selectively transmit the reduced rotation speed of the third operating member to the fifth operating member. The third clutch C3 selectively connects the seventh operating member to the input shaft 100 to selectively transmit the rotation speed of the input shaft 100 to the seventh operating member. The fourth clutch C4 selectively connects the fifth operating member to the input shaft 100 to selectively transmit the rotation speed of the input shaft 100 to the fifth operating member. The fifth clutch C5 selectively connects the third operating member to the fourth operating member to selectively transmit the reduced rotation speed of the third operating member to the fourth operating member. The first brake B1 selectively connects the fourth operating member to the transmission case 300 to selectively stop the fourth operating member. The second brake B2 selectively connects the fifth operating member to the transmission case 300 to selectively stop the fifth operating member. The third brake B3 selectively connects the sixth operating member to the transmission case 300 to selectively stop the sixth operating member.

Hereinafter, referring to FIG. 1, the power train of an automatic transmission according to the first exemplary embodiment of the present invention will be described in detail.

As shown in FIG. 1, according to the first exemplary embodiment of the present invention, the speed reduction unit PG1 is a first planetary gear set having a first sun gear S1, a first ring gear R1, and a first planet carrier PC1 as operating members thereof. The first planetary gear set is a single pinion planetary gear set. A first pinion gear P1, being engaged with the first ring gear R1 and the first sun gear S1, is connected to the first planet carrier PC1. In addition, the first sun gear S1 is operated as the first operating member, the first ring gear R1 is operated as the second operating member, and the first planet carrier PC1 is operated as the third operating member.

The output unit PG2 is a second planetary gear set having a second sun gear S2, a third sun gear S3, a second planet carrier PC2, a second ring gear R2, and a third ring gear R3 as operating members thereof. The second planetary gear set is a compound planetary gear set where a single pinion planetary gear set provided with the second sun gear S2, the second planet carrier PC2, and the second ring gear R2 and a double pinion planetary gear set provided with the third sun gear S3, the second planet carrier PC2, and the third ring gear R3 have the second planet carrier PC2 in common.

The second planet carrier PC2 is connected to a second pinion gear P2 and a third pinion gear P3 in common. One end of the second pinion gear P2 is respectively engaged with the second ring gear R2 and the second sun gear S2, and the other end of the second pinion gear P2 is respectively engaged with the third ring gear R3 and the third pinion gear P3. In addition, the third pinion gear P3 is engaged with the third sun gear S3.

Further, the second sun gear S2 is operated as the fourth operating member, the second planet carrier PC2 is operated as the fifth operating member, the second ring gear R2 is operated as the sixth operating member, the third sun gear S3 is operated as the seventh operating member, and the third ring gear R3 is operated as the eighth operating member.

Hereinafter, referring to FIG. 2, operation of the power train of an automatic transmission according to the first exemplary embodiment of the present invention will be described.

As shown in FIG. 2, according to the first exemplary embodiment of the present invention, the first clutch C1 and the third brake B3 are applied in a first forward speed D1, the first clutch C1 and the second brake B2 are applied in a second forward speed D2, the first clutch C1 and the first brake B1 are applied in a third forward speed D3, the first clutch C1 and the second clutch C2 are applied in a fourth forward speed D4, the second clutch C2 and the third clutch C3 are applied in a fifth forward speed D5 the third clutch C3 and the fifth clutch C5 are applied in a sixth forward speed D6, the third clutch C3 and the fourth clutch C4 are applied in a seventh forward speed D7, the fourth clutch C4 and the fifth clutch C5 are applied in a eighth forward speed D8, and the fourth clutch C4 and the first brake B1 are applied in a ninth forward speed D9.

In addition, the fifth clutch C5 and the third brake B3 are applied in a first reverse speed REV1, and the fifth clutch C5 and the second brake B2 are applied in a second reverse speed REV2.

Hereinafter, formation of the nine forward speeds and two reverse speeds in the power train of an automatic transmission according to the first exemplary embodiment of the present invention will be described in detail.

Figure 3:
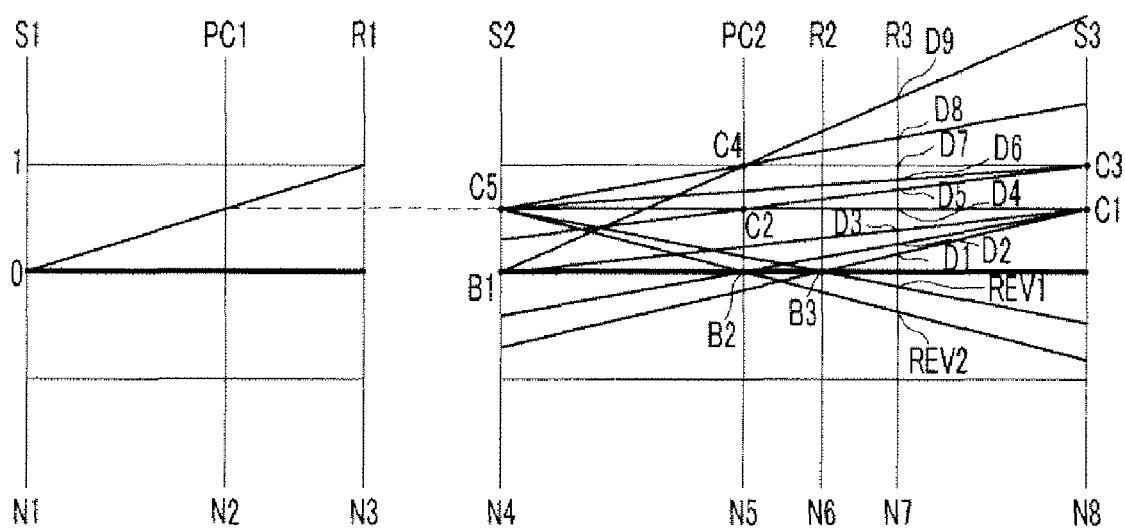
FIG. 3 is a lever diagram showing shifting processes from a first forward speed to an ninth forward speed and two reverse speeds in a power train of an automatic transmission according to the first exemplary embodiment of the present invention.

As shown in FIG. 3, the power train of an automatic transmission according to the first exemplary embodiment of the present invention includes one single pinion planetary gear set and one compound planetary gear set. Therefore, operating members of the power train according to the first exemplary embodiment of the present invention are represented as eight nodes in the lever diagram.

Accordingly, the first sun gear S1 is set as a first node N1, the first planet carrier PC1 is set as a second node N2, the first ring gear R1 is set as a third node N3, the second sun gear S2 is set as a fourth node N4, the second planet carrier PC2 is set as a fifth node N5, the second ring gear R2 is set as a sixth node N6, the third ring gear R3 is set as a seventh node N7, and the third sun gear S3 is set as a eighth node N8.

As described above, the first sun gear S1 is always connected to the transmission case 300, and thus the first node N1 is always stopped. In addition, the first ring gear R1 is always connected to the input shaft 100, and thus the third node N3 rotates with the same rotation speed as the input shaft 100. Therefore, the second node N2 of the first planet carrier PC1 outputs the reduced rotation speed.

The second sun gear S2 is selectively connected to the first planet carrier PC1 by the fifth clutch C5 and is selectively connected to the transmission case 300 by the first brake B1. Therefore, the fourth node N4 of the second sun gear S2 rotates with the reduced rotation speed output from the first planet carrier PC1 by operation of the fifth clutch C5 or is stopped by operation of the first brake B1.

The second planet carrier PC2 is selectively connected to the input shaft 100 by operation of the fourth clutch C4, is selectively connected to the first planet carrier PC1 by operation of the second clutch C2, or is selectively connected to the transmission case 300 by operation of the second brake B2. Therefore, the fifth node N5 of the second planet carrier PC2 rotates with the same rotation speed as the input shaft 100 by operation of the fourth clutch C4, rotates with the reduced rotation speed output from the first planet carrier PC1 by operation of the second clutch C2, or is stopped by operation of the second brake B2.

The second ring gear R2 is selectively connected to the transmission case 300 by operation of the third brake B3, and thus the sixth node N6 of the second ring gear R2 is stopped by operation of the third brake B3.

The seventh node N7 of the third ring gear R3 is always connected to the output gear 200 and operates as an output member.

The third sun gear S3 is selectively connected to the input shaft 100 by operation of the third clutch C3 and is selectively connected to the first planet carrier PC1 by operation of the first clutch C1. Therefore, the eighth node N8 of the third sun gear S3 rotates with the same rotation speed as the input shaft 100 by operation of the third clutch C3 or rotates with the reduced rotation speed output from the first planet carrier PC1 by operation of the first clutch C1.

Hereinafter, processes for realizing respective shift speeds in the power train of an automatic transmission according to the first exemplary embodiment of the present invention will be described in detail, referring to FIG. 3.

In the first forward speed D1, the eighth node N8 rotates with the reduced rotation speed output from the first planet carrier PC1 by the operation of the first clutch C1. In addition, the sixth node N6 is stopped by the operation of the third brake B3. Therefore, the first forward speed D1 is generated at the seventh node N7.

In the second forward speed D2, the eighth node Ng rotates with the reduced rotation speed output from the first planet carrier PC1 by the operation of the first clutch C1. In addition, the fifth node N5 is stopped by the operation of the second brake B2. Therefore, the second forward speed D2 is generated at the seventh node N7.

In the third forward speed D3, the eighth node N8 rotates with the reduced rotation speed output from the first planet carrier PC1 by the operation of the first clutch C1. In addition, the fourth node N4 is stopped by the operation of the first brake B1. Therefore, the third forward speed D3 is generated at the seventh node N7.

In the fourth forward speed D4, the eighth node Ng rotates with the reduced rotation speed output from the first planet carrier PC1 by the operation of the first clutch C1. In addition, the fifth node N5 also rotates with the reduced rotation speed output from the first planet carrier PC1 by the operation of the second clutch C2. Therefore, the fourth forward speed D4 is generated at the seventh node N7.

In the fifth forward speed D5, the fifth node N5 rotates with the reduced rotation speed output from the first planet carrier PC1 by the operation of the second clutch C2. In addition, the eighth node N8 rotates with the same rotation speed as the input shall 100 by the operation of the third clutch C3. Therefore, the fifth forward speed D5 is generated at the seventh node N7.

In the sixth forward speed D6, the eighth node N8 rotates with the same rotation speed as the input shalt 100 by the operation of the third clutch C3. In addition, the fourth node N4 rotates with the reduced rotation speed output from the first planet carrier PC1 by the operation of the fifth clutch C5. Therefore, the sixth forward speed D6 is generated at the seventh node N7.

In the seventh forward speed D7, the eighth node N8 rotates with the same rotation speed as the input shalt 100 by the operation of the third clutch C3. In addition, the fifth node N5 also rotates with the same rotation speed as the input shaft 100 by the operation of the fourth clutch C4. Therefore, the seventh forward speed D7 is generated at the seventh node N7.

In the eighth forward speed D8, the fifth node N5 rotates with the same rotation speed as the input shaft 100 by the operation of the fourth clutch C4. In addition, the fourth node N4 rotates with the reduced rotation speed output from the first planet carrier PC1 by the operation of the fifth clutch C5. Therefore, the eighth forward speed D8 is generated at the seventh node N7.

In the ninth forward speed D9, the fifth node N5 rotates with the same rotation speed as the input shaft 100 by the operation of the fourth clutch C4. In addition, the fourth node N4 is stopped by the operation of the first brake B1. Therefore, the ninth forward speed D9 is generated at the seventh node N7.

In the first reverse speed REV1 the fourth node N4 rotates with the reduced rotation speed output front the first planet carrier PC1 by the operation of the fifth clutch C5. In addition the sixth node N6 is stopped by the operation of the third brake B3. Therefore, the first reverse speed REV1 is generated at the seventh node N7.

In the second reverse speeds REV2, the fourth node N4 rotates with the reduced rotation speed output from the first planet carrier PC1 by the operation of the fifth clutch C5. In addition, the filth node N5 is stopped by the operation of the second brake B2. Therefore, the second reverse speed REV2 is generated at the seventh node N7.

Hereinafter, power trains of an automatic transmission according to other exemplary embodiments of the present inventions will be described. The power trains of an automatic transmission according to other exemplary embodiments of the present inventions are similar to the power train of an automatic transmission according to the first exemplary embodiment of the present invention. Therefore, only differences between the first embodiment of the present invention and the other embodiments of the present invention will be described.

Figure 4:
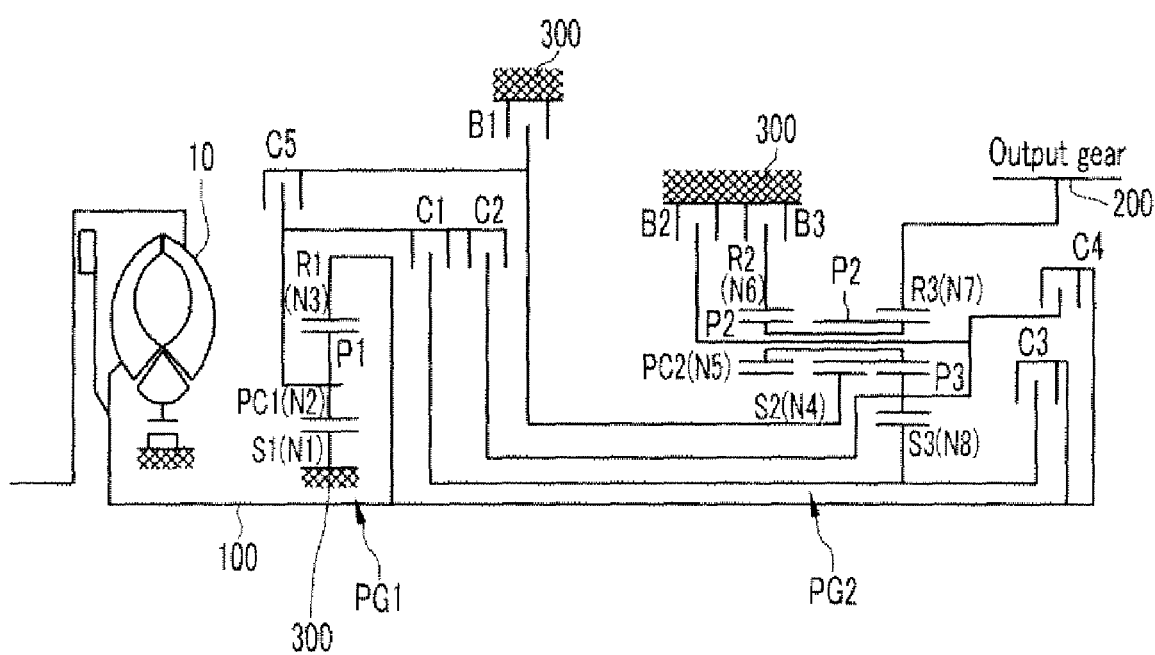
FIG. 4 is a schematic diagram of a power train of an automatic transmission according to the second exemplary embodiment of the present invention.

As shown in FIG. 4, according to the second exemplary embodiment of the present invention, the speed reduction unit PG1 is a first planetary gear set having a first sun gear S1, a first ring gear R1, and a first planet carrier PC1 as operating members thereof. The first planetary gear set is a single pinion planetary gear set. A first pinion gear P1, being engaged with the first ring gear R1 and the first sun gear S1, is connected to the first planet carrier PC1. In addition, the first sun gear S1 is always connected to the transmission case 300 and is operated as the first operating member, the first ring gear R1 is operated as the second operating member, and the first planet carrier PC1 is operated as the third operating member.

The output unit PG2 is a second planetary gear set having a second sun gear S2, a third sun gear S3, a second planet carrier PC2, a second ring gear R2, and a third ring gear R3 as operating members thereof. The second planetary gear set is a compound planetary gear set where a single pinion planetary gear set provided with the second sun gear S2, the second planet carrier PC2, and the second ring gear R2 and a double pinion planetary gear set provided with the third sun gear S8, the second planet carrier PC2, and the third ring gear R3 have the second planet carrier PC2 in common with the single pinion planetary gear set.

The second planet carrier PC2 is connected to the second pinion gear P2 and the third pinion gear P3. One end of the second pinion gear P2 is engaged with the second ring gear R2, a middle portion of the second pinion gear P2 is engaged with the second sun gear S2, and the other end of the second pinion gear P1 is respectively engaged with the third ring gear R3 and the third pinion gear P3. In addition, the third pinion gear P3 is engaged with the third sun gear S3.

Further, the second sun gear S2 is operated as the fourth operating member, the second planet carrier PC2 is operated as the fifth operating member, the second ring gear R2 is operated as the sixth operating member, the third sun gear S3 is operated as the seventh operating member, and the third ring gear R3 is operated as the eighth operating member.

Figure 6:
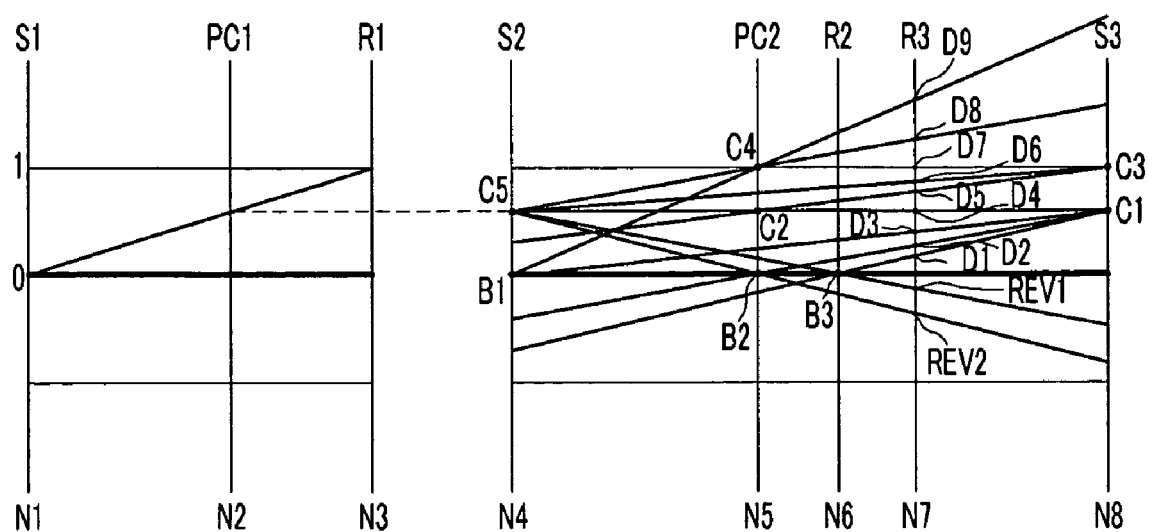
FIG. 6 is a lever diagram showing shifting processes from a first forward speed to an ninth forward speed and two reverse speeds in a power train of an automatic transmission according to the second exemplary embodiment of the present invention.

Operation, shifting processes, and formation of each speed of the power train according to the second exemplary embodiment of the present invention as shown in FIGS. 5 and 6 are similar to those of the power train according to the first embodiment of the present invention, and may be easily obtained by a person skilled in the art based on the teachings herein. Thus, a detailed explanation thereof will be omitted.

Figure 7:
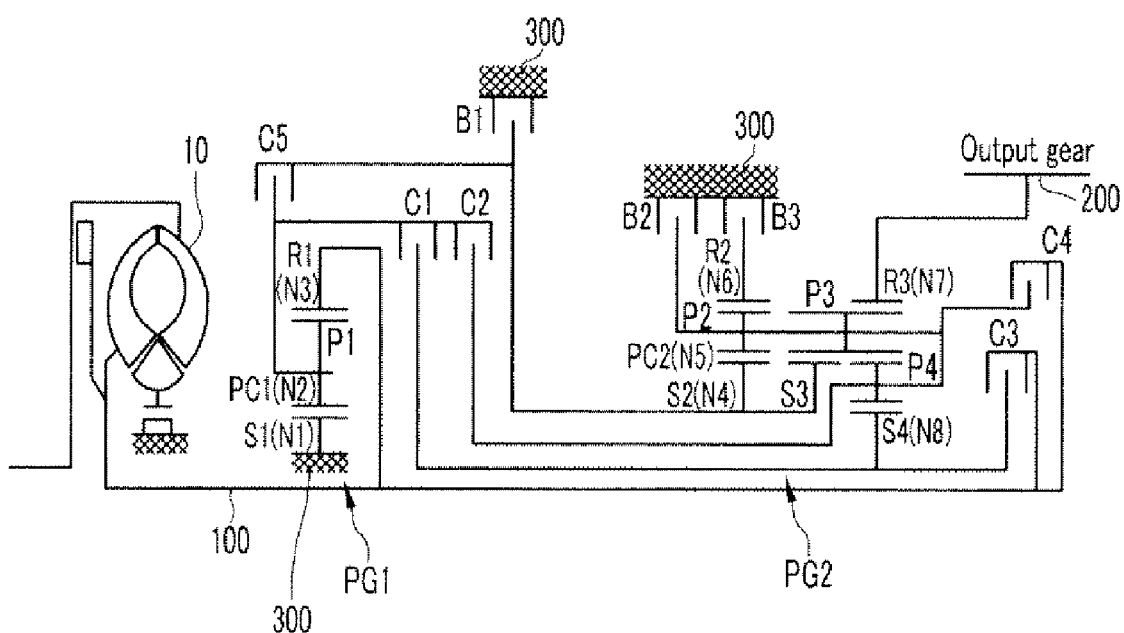
FIG. 7 is a schematic diagram of a power train of an automatic transmission according to the third exemplary embodiment of the present invention.

As shown in FIG. 7, according to the third exemplary embodiment of the present invention, the speed reduction unit PG1 is a first planetary gear set having a first sun gear S1, a first ring gear R1, and a first planet carrier PC1 as operating members thereof. The first planetary gear set is a single pinion planetary gear set. A first pinion gear P1, being engaged with the first ring gear R1 and the first Sun gear S1, is connected to the first planet carrier PC1. In addition, the first sun gear S1 is always connected to the transmission case 300 and is operated as the first operating member, the first ring gear R1 is operated as the second operating member, and the first planet carrier PC1 is operated as the third operating member.

The output unit PG2 is a second planetary gear set having a second sun gear S2, a third sun gear S3, a fourth sun gear S4, a second planet carrier PC2, a second ring gear R2, and a third ring gear R3 as operating members thereof. The second planetary gear set is a compound planetary gear set where a single pinion planetary gear set provided with the second sun gear S2, the second planet carrier PC2, and the second ring gear R2 and a Ravingneaux planetary gear set provided with the third sun gear S3, the fourth sun gear 84, the second planet carrier PC2, and the third ring gear R3 have the second planet carrier PC2 in common.

The second planet carrier PC2 is connected to the second pinion gear P2, the third pinion gear P3, and the fourth pinion gear P4, and the second pinion gear P2 is coaxially connected to the third pinion gear P3. The second pinion gear P2 is respectively engaged with the second ring gear R2 and the second sun gear S2. One end of the third pinion gear P3 is engaged with the third sun gear S3, and the other end of the third pinion gear P3 is respectively engaged with the third ring gear R3 and the fourth pinion gear P4. The fourth pinion gear P4 is engaged with the fourth sun gear S4.

In addition, the second sun gear S2 is fixedly connected to the third sun gear S3. The fixedly connected second sun gear S2 and the third sun gear S3 are operated as the fourth operating member, the second planet carrier PC2 is operated as the fifth operating member, the second ring gear R2 is operated as the sixth operating member, the fourth sun gear S4 is operated as the seventh operating member, and the third ring gear R3 is operated as the eighth operating member.

Figure 9:
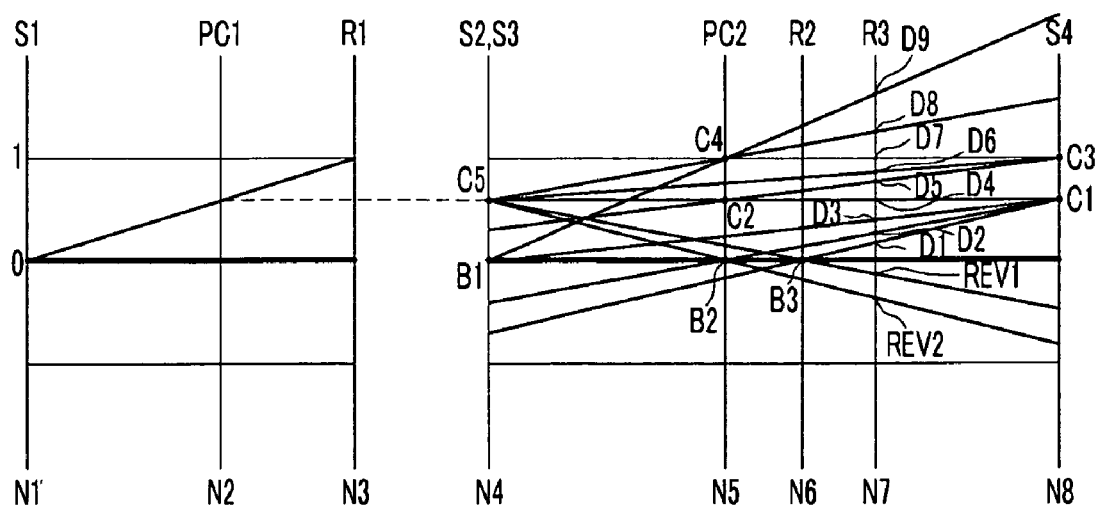
FIG. 9 is a lever diagram showing shifting processes from a first forward speed to an ninth forward speed and two reverse speeds in a power train of an automatic transmission according to the third exemplary embodiment of the present invention.

Operation, shifting processes, and formation of each speed of the power train according to the third exemplary embodiment of the present invention as shown in FIGS. 8 and 9 are similar to those of the power train according to the first embodiment of the present invention, and may be easily obtained by a person skilled in the art based on the teachings herein. Thus, a detailed explanation thereof will be omitted.

According to the exemplary embodiments of the present invention, nine forward speeds and two reverse speeds may be realized by using three or four planetary gear sets, five clutches, and three brakes.

In addition, since many shift speeds are realized, torque of an engine may be effectively used, power delivery performance may be improved, and fuel consumption may be reduced.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention) as well as various alternatives and modifications thereof. It is intended that technical spirit and scope of the present invention be defined by the Claims appended hereto and their equivalents.

What is claimed is:

1. A power train of an automatic transmission, comprising:
   a speed reduction unit comprising a first operating member fixedly connected to a transmission case, a second operating member always receiving rotation speed of an input shaft, and a third operating member generating reduced rotation speed by operation of the first and second operating members;
   an output unit comprising a fourth operating member selectively receiving the reduced rotation speed from the third operating member or selectively connected to the transmission case, a fifth operating member selectively receiving the rotation speed of the input shaft, selectively receiving the reduced rotation speed from the third operating member, or selectively connected to the transmission case, a sixth operating member selectively connected to the transmission case, a seventh operating member selectively receiving the reduced rotation speed from the third operating member or selectively receiving the rotation speed of the input shaft, and an eighth operating member generating nine forward speeds and two reverse speeds by operation of the fourth, fifth, sixth, and seventh operating members; and
   a plurality of friction members selectively connecting the operating members of the speed reduction unit and the output unit to the input shaft, other operating members, or the transmission case therebetween;
   wherein the plurality of friction members comprise:
      a first clutch selectively connecting the third operating member to the seventh operating member;
      a second clutch selectively connecting the third operating member to the fifth operating member;
      a third clutch selectively connecting the seventh operating member to the input shaft;
      a fourth clutch selectively connecting the fifth operating member to the input shaft;
      a fifth clutch selectively connecting the third operating member to the fourth operating member;

a first brake selectively connecting the fourth operating member to the transmission case;
a second brake selectively connecting the fifth operating member to the transmission case; and
a third brake selectively connecting the sixth operating member to the transmission case.

2. The power train of claim 1, wherein the speed reduction unit is a first planetary gear set having a first sun gear, a first ring gear, and a first planet carrier as operating members thereof.

3. The power train of claim 2, wherein the first planetary gear set is a single pinion planetary gear set, and wherein the first sun gear is operated as the first operating member, the first ring gear is operated as the second operating member, and the first planet carrier is operated as the third operating member.

4. The power train of claim 3, wherein the output unit is a second planetary gear set having a second sun gear, a third sun gear, a second planet carrier, a second ring gear, and a third ring gear as operating members thereof, wherein the second planetary gear set is a compound planetary gear set where a single pinion planetary gear set provided with the second sun gear, the second planet carrier and the second ring gear, and a double pinion planetary gear set provided with the third sun gear, the second planet carrier and the third ring gear have the second planet carrier in common.

5. The power train of claim 4, wherein the second sun gear is operated as the fourth operating member, the second planet carrier is operated as the fifth operating member, the second ring gear is operated as the sixth operating member, the third sun gear is operated as the seventh operating member, and the third ring gear is operated as the eighth operating member.

6. The power train of claim 4, wherein the second planet carrier is connected to a second pinion gear and a third pinion gear,
wherein one end of the second pinion gear is respectively engaged with the second ring gear and the second sun gear, the other end of the second pinion gear is engaged with the third ring gear and the third pinion gear, and the third pinion gear is engaged with the third sun gear.

7. The power train of claim 4, wherein the second planet carrier is connected to a second pinion gear and a third pinion gear,
wherein one end of the second pinion gear is engaged with the second ring gear,
a middle portion of the second pinion gear is engaged with the second sun gear,
the other end of the second pinion gear is respectively engaged with the third ring gear and the third pinion gear, and
the third pinion gear is engaged with the third sun gear.

8. The power train of claim 3, wherein the output unit is a second planetary gear set having a second sun gear, a second planet carrier, a second ring gear, a third sun gear, a fourth sun gear, and a third ring gear as operating members thereof, wherein the second planetary gear set is a compound planetary gear set where a single pinion planetary gear set provided with the second sun gear, the second planet carrier, and the second ring gear and a Ravingneaux planetary gear set provided with the third sun gear, the fourth sun gear, the second planet carrier, and the third ring gear have the second planet carrier in common.

9. The power train of claim 8, wherein the second sun gear is fixedly connected to the third sun gear,
wherein the fixedly connected second sun gear and third sun gear are operated as the fourth operating member, the second planet carrier is operated as the fifth operating member, the second ring gear is operated as the sixth operating member, the fourth sun gear is operated as the seventh operating member, and the third ring gear is operated as the eighth operating member.

10. The power train of claim 9, wherein the second planet carrier is connected to a second pinion gear, a third pinion gear, and a fourth pinion gear, and the second pinion gear is coaxially connected to the third pinion gear,
wherein the second pinion gear is respectively engaged with the second ring gear and the second sun gear,
one end of the third pinion gear is engaged with the third sun gear,
the other end of the third pinion gear is respectively engaged with the third ring gear and the fourth pinion gear, and
the fourth pinion gear is engaged with the fourth sun gear.

* * * * *